United States Patent [19]
Dutson

[11] Patent Number: 5,839,319
[45] Date of Patent: Nov. 24, 1998

[54] SYSTEM FOR PREVENTING GEAR HOPOUT IN A COMPOUND TRANSMISSION

[75] Inventor: Brian Dutson, Manchester, England

[73] Assignee: Eaton Corporation, Cleveland, Ohio

[21] Appl. No.: 878,739

[22] Filed: Jun. 19, 1997

[30] Foreign Application Priority Data

Jun. 19, 1996 [GB] United Kingdom .................... 9612787

[51] Int. Cl.⁶ ...................................................... F16H 3/38
[52] U.S. Cl. .................................. 74/339; 74/325; 74/333
[58] Field of Search .............................. 74/325, 333, 335, 74/339, 329; 192/53.34, 53.341

[56] References Cited

U.S. PATENT DOCUMENTS

| | | |
|---|---|---|
| 3,138,965 | 6/1964 | Brey et al. . |
| 4,299,317 | 11/1981 | Katayama ............................ 192/53.34 |
| 4,315,564 | 2/1982 | Numazawa et al. ................. 192/53.34 |
| 4,566,568 | 1/1986 | Yant ...................................... 74/339 X |
| 4,669,326 | 6/1987 | Kawamoto ............................ 74/325 X |
| 5,178,250 | 1/1993 | Ashikawa et al. .................... 74/333 X |
| 5,641,045 | 6/1997 | Ogawa et al. ......................... 74/339 X |
| 5,701,984 | 12/1997 | Park ....................................... 74/339 X |
| 5,738,194 | 4/1998 | Hughes ................................. 74/339 X |

FOREIGN PATENT DOCUMENTS

| | | |
|---|---|---|
| 195 11 576 | 10/1995 | Germany . |
| 0 071 353 | 2/1983 | United Kingdom . |
| 0 139 491 A1 | 5/1985 | United Kingdom . |

*Primary Examiner*—Dirk Wright
*Assistant Examiner*—Peter T. Kwon
*Attorney, Agent, or Firm*—Brooks & Kushman P.C.

[57] ABSTRACT

A compound transmission design for reducing gear hopout, particularly during PTO operation. In this design, a spindle is rigidly secured to an input shaft, and a headset/fourth gear is rotatably mounted on a spindle by means of a full compliment needle bearing. A splitter gear is rotatably mounted on the input shaft and includes a sufficient diametral float with respect to the input shaft to minimize tipping of the gear while maintaining significant torque balance between countershafts. This configuration maintains concentricity in parallelism of the headset/fourth gear and splitter gear with respect to the synchronizer clutch in order to prevent gear hopout.

13 Claims, 8 Drawing Sheets

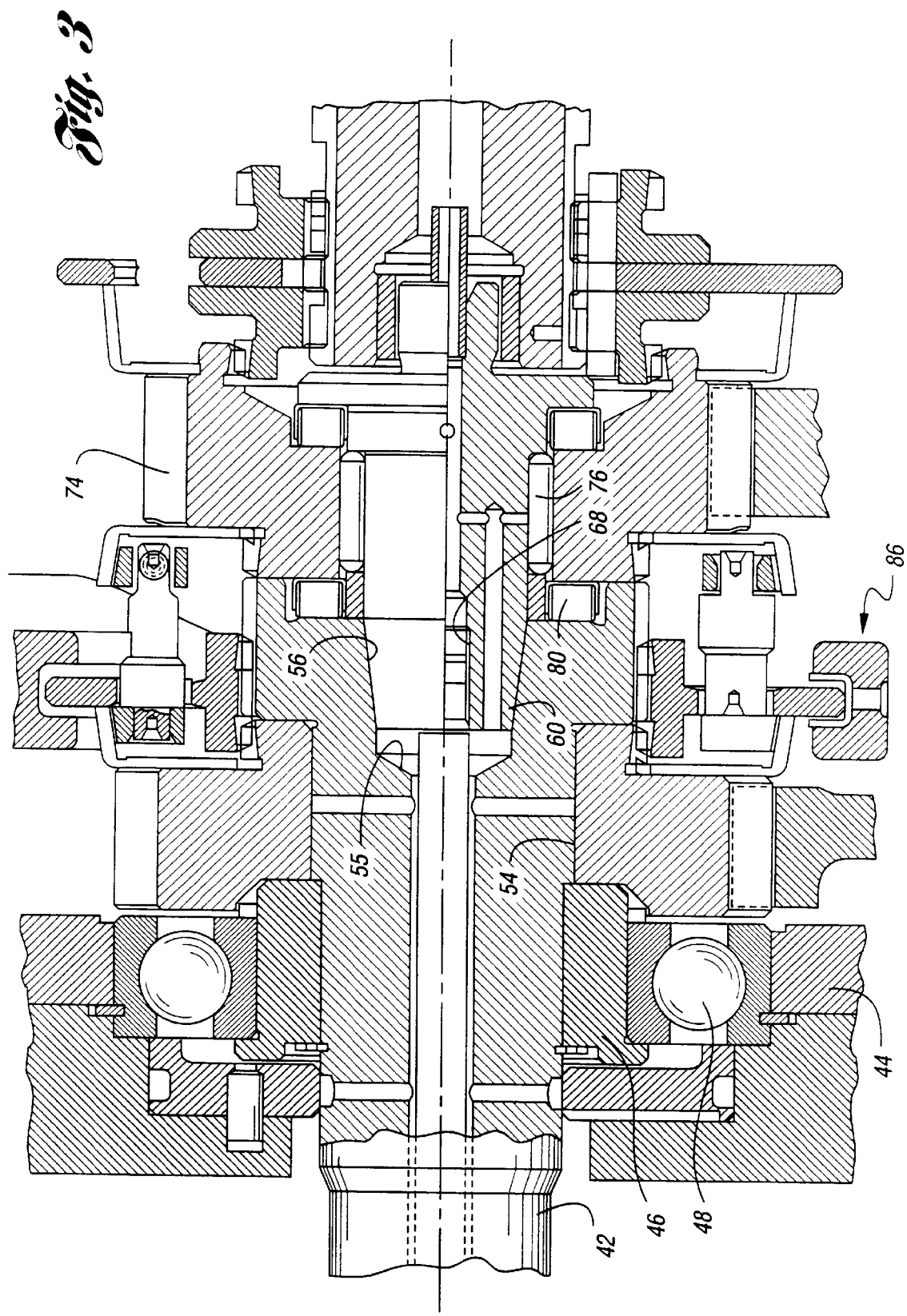

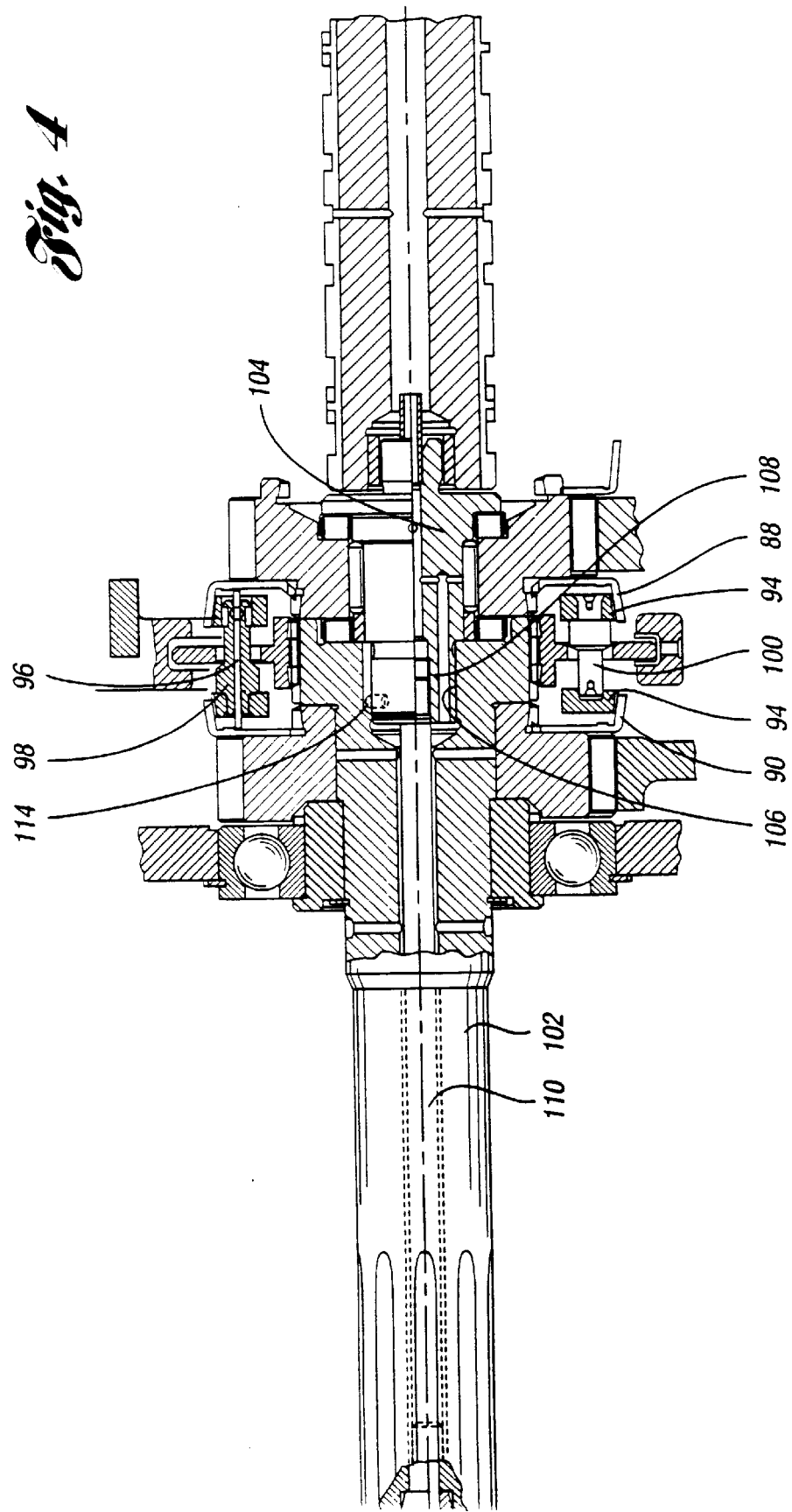

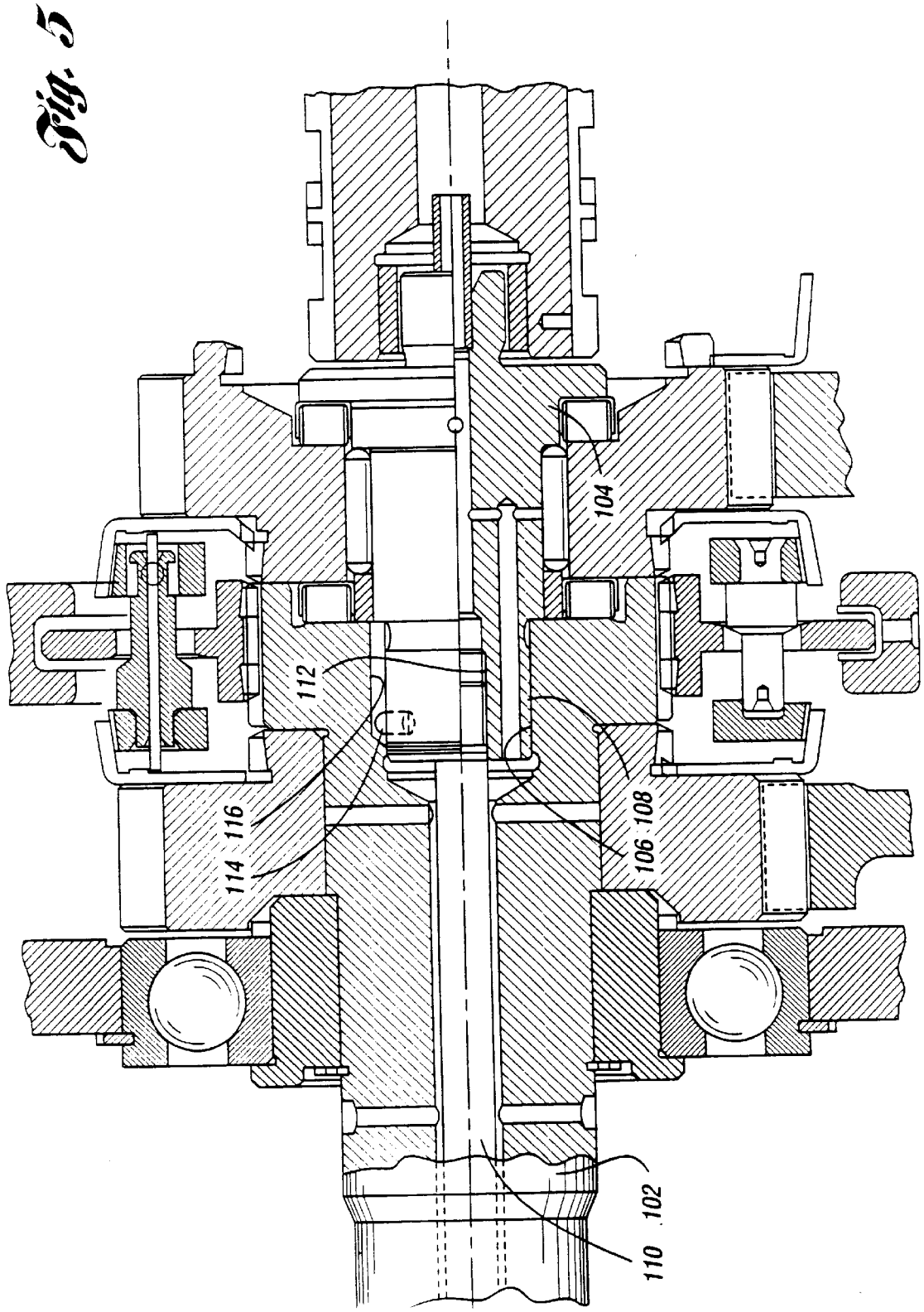

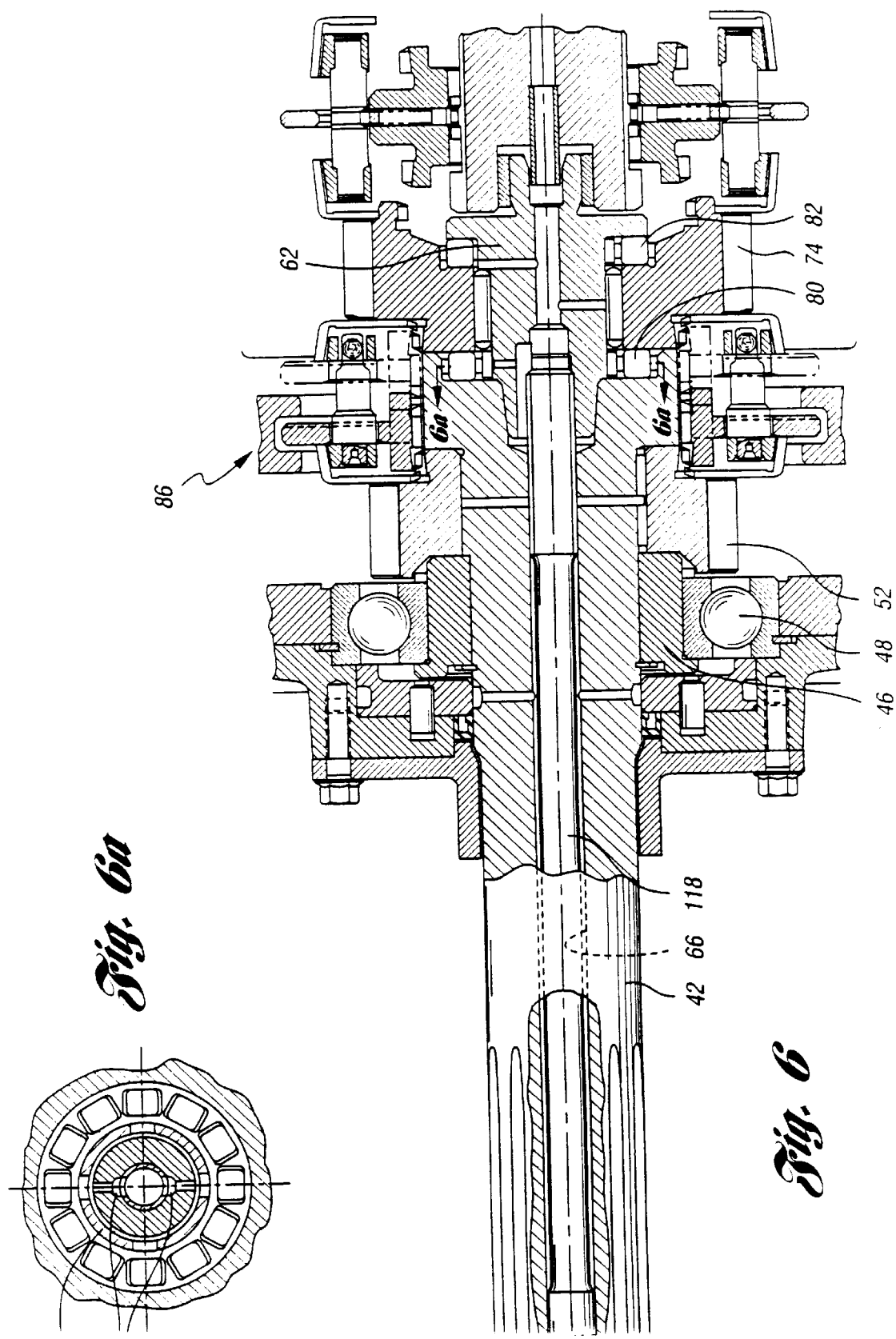

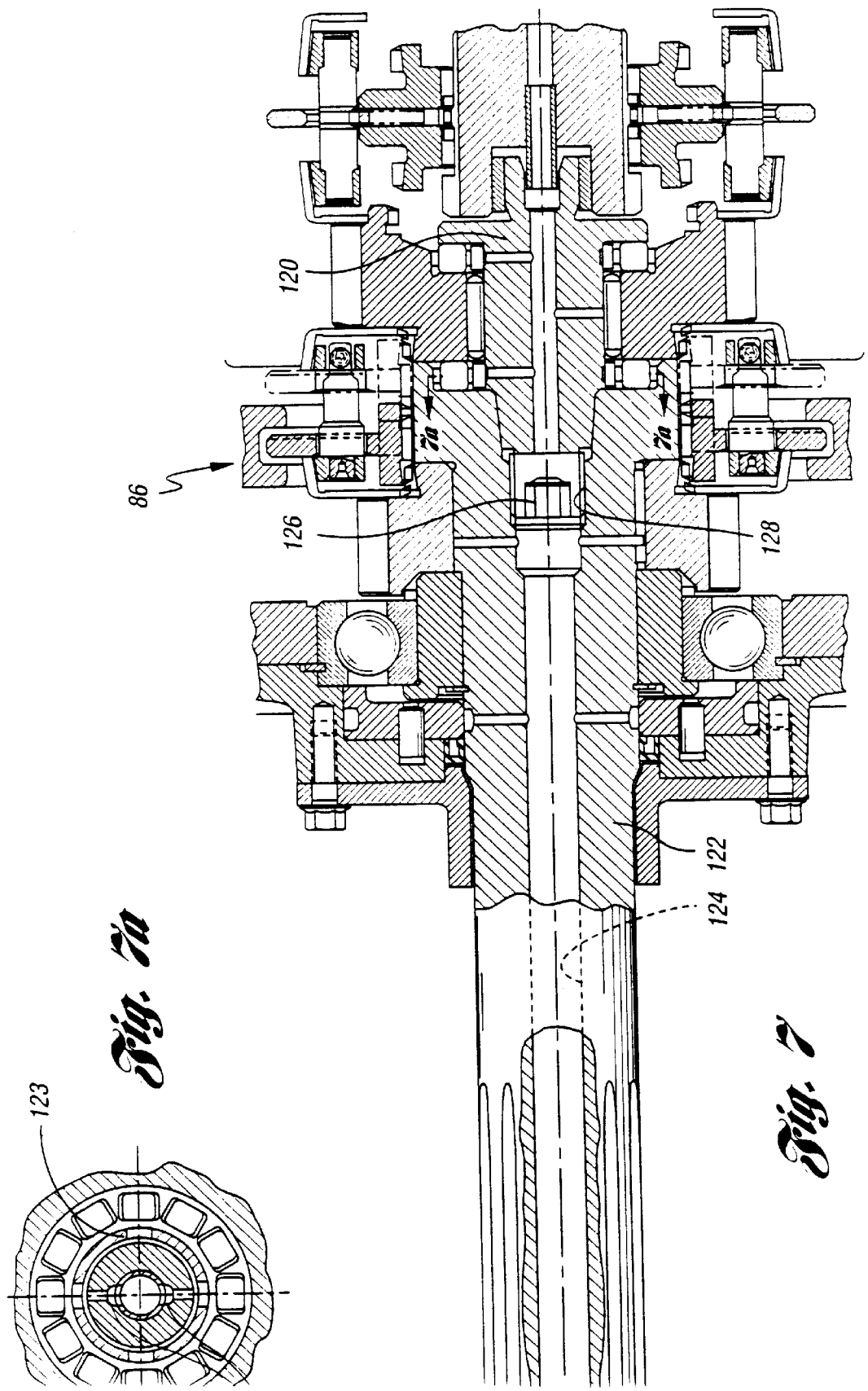

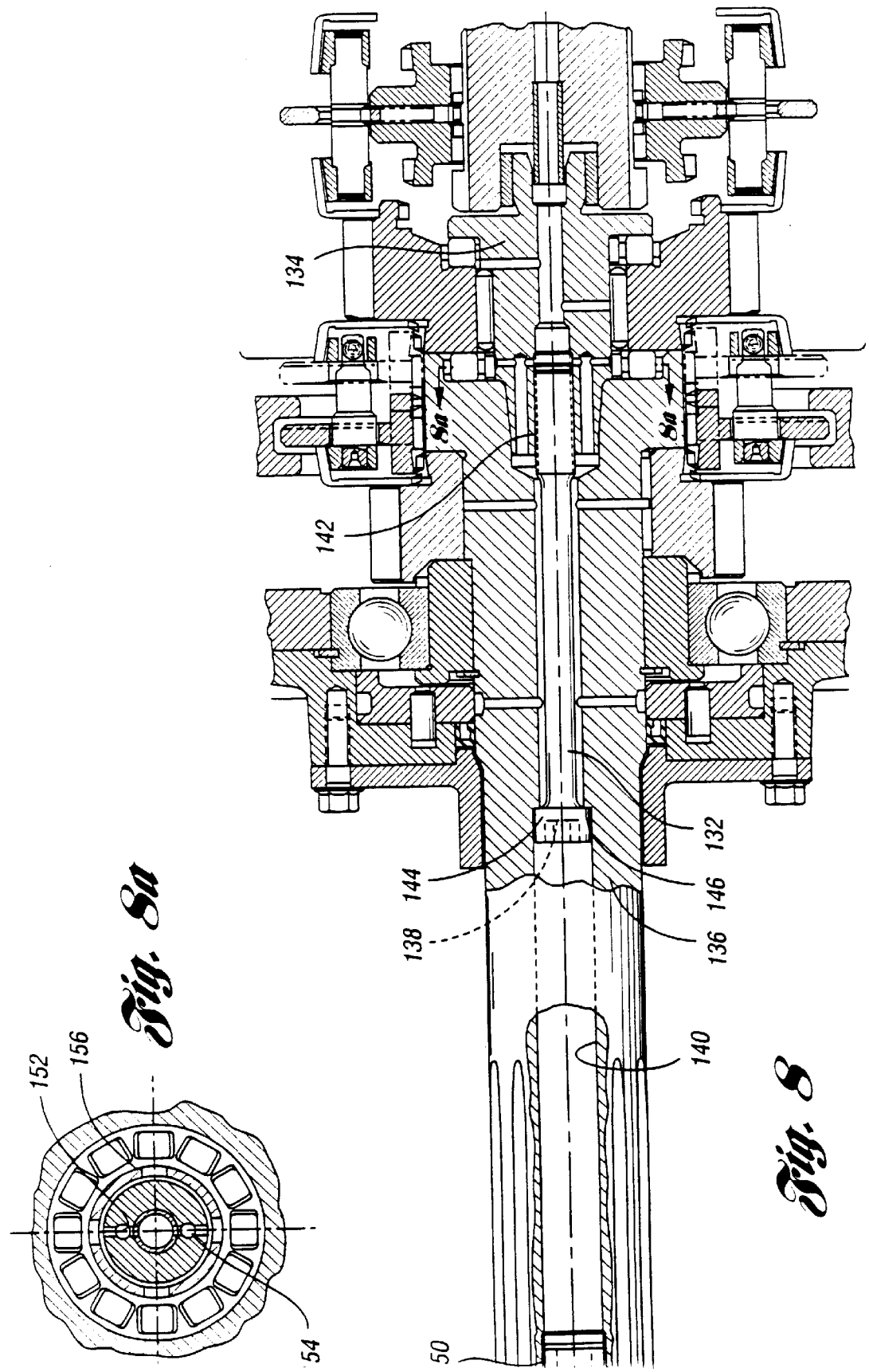

SYSTEM FOR PREVENTING GEAR HOPOUT IN A COMPOUND TRANSMISSION

TECHNICAL FIELD

The present invention relates to compound vehicle transmissions, and more particularly to a system for preventing gear hopout during "power take off" (PTO) operation in a compound transmission.

BACKGROUND ART

Compound change gear transmissions are typically associated with heavy duty vehicles such as large trucks, tractor/semi-trailers, and the like. Compound transmissions comprise main and auxiliary transmission sections connected in series, and provide a total number of available transmission ratios equal to the product of the main and auxiliary section ratios. By way of example, a compound change gear transmission comprising a four (4) speed main section connected in series with a four (4) speed auxiliary section will provide sixteen (4×4=16) available ratios.

Power is transmitted from the engine, through the master clutch and into the transmission via the input shaft. In "Fuller" transmissions, a gear is splined to the input shaft (namely the headset gear) which is permanently enmeshed with two countershaft gears situated 180° apart on the periphery of the headset gear. Torque is transmitted to the countershaft gears and subsequently through the countershafts. The countershafts generally include a number of gears which mate with mainshaft gears which are placed along the same axis of the input shaft, free to float on a floating mainshaft. Clutches are provided between the mainshaft and the mainshaft gears to provide progressive ratios. By moving a clutch from its neutral position to an engaged position, torque is transmitted from the countershafts, into the mainshaft gear, through the clutch and into the mainshaft. This method splits the input torque equally between the countershafts and brings the geared torque back into the mainshaft gear, again split equally.

For the torque to be split equally and effectively, it is important that the mainshaft, mainshaft gears, and clutches are able to float to assume centered positions. It is not necessary to firmly fix the mainshaft gears and mainshaft, as is common practice with single layshaft transmissions, since the separating and tangential forces generated at the gear teeth are equal and opposite and therefore cancel each other out. In fact, fixing the mainshaft/input shaft gears can be detrimental and produce a torque imbalance because it is impossible to manufacture the geartrain perfectly, i.e., to absolute sizes without tolerance. The manufactured tolerances can result in the gear teeth of the mainshaft and input shaft gears being more heavily loaded on one side than the other, and consequently, the gears on one countershaft are loaded more than on the other. Furthermore, this can give rise to gear tipping problems and, in extreme cases, gear hopout during normal driving conditions.

In a single layshaft, medium-duty transmission, torque is supplied into the transmission via the input shaft through the headset gear, and is passed from the headset gear to a mating layshaft gear, and into the single layshaft. In this case, the mainshaft is simply supported with bearings with very little radial clearance. The mainshaft gears are held concentric with the mainshaft on needle roller bearings. This is necessary due to the high tangential and separating forces set up between the two mating gears which must be reacted through rolling elements into the transmission housing.

Compound transmissions are sometimes used for "power take off" (PTO) operation in which torque is transmitted from one of the countershafts to an ancillary unit, such as a pump or flange device for operating a truck bed lifter, etc. The headset gear of a conventional Fuller twin countershaft transmission is splined to the input shaft with a small diametral float, and when a PTO is fitted to the drive from the front countershaft, the transmission is utilized in a single layshaft manner. The headset gear or mainshaft gears are not coupled to the mainshaft, hence no torque split. The headset gear drives torque through one countershaft only. Since the headset gear is not coupled with the clutch, there cannot be any gear hopout. The small diametral clearance ensures that the headset gear runs concentric with the input shaft and the large drive splines are strong enough to sustain the load cycles during PTO operation.

In certain designs, the splitter is configured such that the headset gear, which is usually mounted on the input shaft via a spline, can be free to rotate and float, and performs the low split function (on an overdrive transmission) as well as the fourth gear function. This gear is mounted on a spindle which is screwed into the mainshaft. The headset gear bore includes a clearance fit to the spindle so that it may float under normal driving operation to ensure a balanced torque split. It is also supported axially by cylindrical thrust roller bearings which compensate for the axial thrust forces apparent during normal operation due to the helical gearing, which is not balanced. These forces are accompanied by a differential rotation between the headset gear and spindle when the low split gear is selected (i.e., when it is a driving gear), hence the need for thrust bearings. A splitter gear is then placed on the input shaft, forward of the headset/fourth gear with a plain clearance bore to the input shaft which provides a high split function. These two gears are then selectable using a splitter clutch splined to the input shaft and free to slide along the spline to supply the clutching function.

This design is operational for normal driving conditions, however, when these two gears are used for PTO operation, there is a tendency for the clutch to hopout of engagement. In essence, the reason for this hopout condition, both at high and low split, is due to the fact that the transmission is being used as a single layshaft transmission without bearings under the driving gear.

The hopout can be attributed to inadequate parallelism and concentricity between the selected splitter or headset gear, splitter clutch and shaft on which the gear is situated. The gear becomes displaced radially taking up the clearance between the gear bore and shaft at the high split position, and similarly at the low split position but with the added clearance that exits due to the floating nature of the mainshaft and spindle. This results in a tipping affect.

The need exists for providing such torque splitting options, while also providing the availability of PTO operation corresponding with both the splitter gear and the headset/fourth gear. It is necessary to provide gear float for balanced torque splitting, however, unfortunately, this float allows greater gear tipping, particularly during PTO operation, which increases the likelihood of gear hopout at the splitter clutch.

DISCLOSURE OF THE INVENTION

The present invention overcomes the above-referenced short-comings of prior art compound transmission assemblies by providing a compound transmission which includes a splitter gear rotatably mounted on an input shaft, a spindle rigidly secured to the input shaft, and a headset/fourth gear rotatably mounted on the spindle. The splitter gear is provided with a minimal diametral float with respect to the input shaft in order to minimize splitter gear tipping while allowing substantially balanced torque splitting between opposing countershafts. A sufficient diametral float is also maintained in order to maintain the substantial load sharing balance. With the spindle rigidly mounted to the input shaft, and the headset/fourth gear rotatably mounted on the spindle via a full complement needle roller bearing, parallelism and concentricity between the selected splitter or headset/fourth gear is maintained with respect to the splitter clutch in order to prevent gear hopout.

More specifically, the present invention provides an improved compound transmission with reduced gear hopout. The transmission includes an input shaft disposed along a central axis, a floating main shaft disposed substantially along the central axis, an auxiliary section adjacent the main shaft, and at least one countershaft parallel with and spaced from the central axis. The countershaft is operative to transmit input shaft torque to the main shaft and to facilitate "power take off" (PTO) operation. A splitter gear is disposed on the input shaft and includes a central bore formed therethrough with a minimal diametral clearance with respect to the input shaft to minimize splitter gear tipping. The input shaft forms a central aperture therethrough along the central axis and has a rearward end. The input shaft forms a spindle pocket along the central axis at the rearward end. A spindle is received in the spindle pocket and includes an attachment aperture formed therethrough along the central axis in communication with the central aperture. An attachment stud extends through the central aperture, and further through the attachment aperture in the spindle for rigidly securing the spindle to the input shaft. The headset gear is rotatably mounted on the spindle.

Accordingly, an object of the present invention is to provide a compound transmission assembly with substantially balanced torque splitting capability with low split and high split operations available while reducing the likelihood of gear hopout during PTO operation.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIG. 3 shows an enlarged view of the cross-section shown in FIG. 2;

FIG. 4 shows a sectional view of an alternative embodiment of a transmission assembly in accordance with the present invention;

FIG. 5 shows an enlarged view of the cross-section shown in FIG. 4;

FIG. 6 shows a partially cut-away sectional view of a transmission assembly in accordance with a second alternative embodiment of the present invention;

FIG. 7 shows a partially cut-away sectional view of a third alternative embodiment of a transmission assembly in accordance with the present invention; and FIG. 8 shows a partially cut-away sectional view of a fourth alternative embodiment of a transmission assembly in accordance with the present invention.

DETAILED DESCRIPTION OF THE PREFERRED EMBODIMENT

Figure 1:
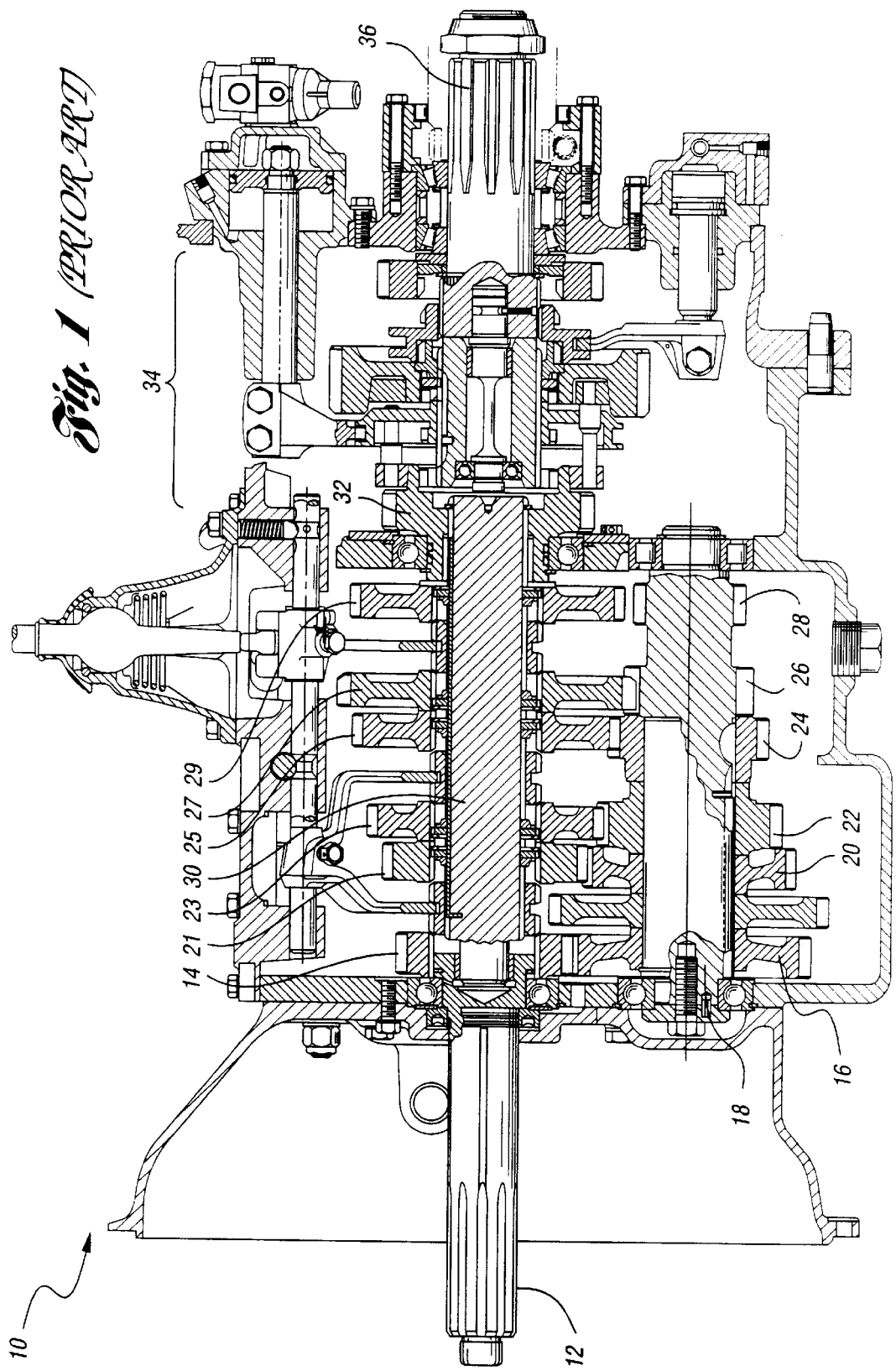
FIG. 1 shows a vertical cross-section of a prior art "Fuller" twin countershaft compound change transmission.

FIG. 1 shows a sectional view of a prior art "Fuller" twin countershaft compound change transmission assembly 10. This typical twin counter shaft assembly includes an input shaft 12 which carries torque from the engine into the transmission. The input shaft 12 drives the headset gear 14, which is splined to the input shaft 12, and also permanently enmeshed with opposing countershaft gears 16. The countershaft 18 includes a series of gears 20,22,24,26 and 28 which mate with corresponding mainshaft gears 21,23,25,27 and 29 which are placed along the same axis as the input shaft, free to float on a floating mainshaft 30. Clutches are provided between the mainshaft 30 and the mainshaft gears to provide progressive ratios. Torque then is transmitted from the mainshaft through the auxiliary drive gear 32, and into the auxiliary section 34, and finally through the output shaft 36.

The present invention, as shown in various embodiments in FIGS. 2–8, provides such a compound transmission design with substantially balanced torque splitting, while also providing the availability of PTO operation corresponding with both the splitter gear and the headset/fourth gear without increasing the risk of gear hopout during PTO operation.

Figure 2:
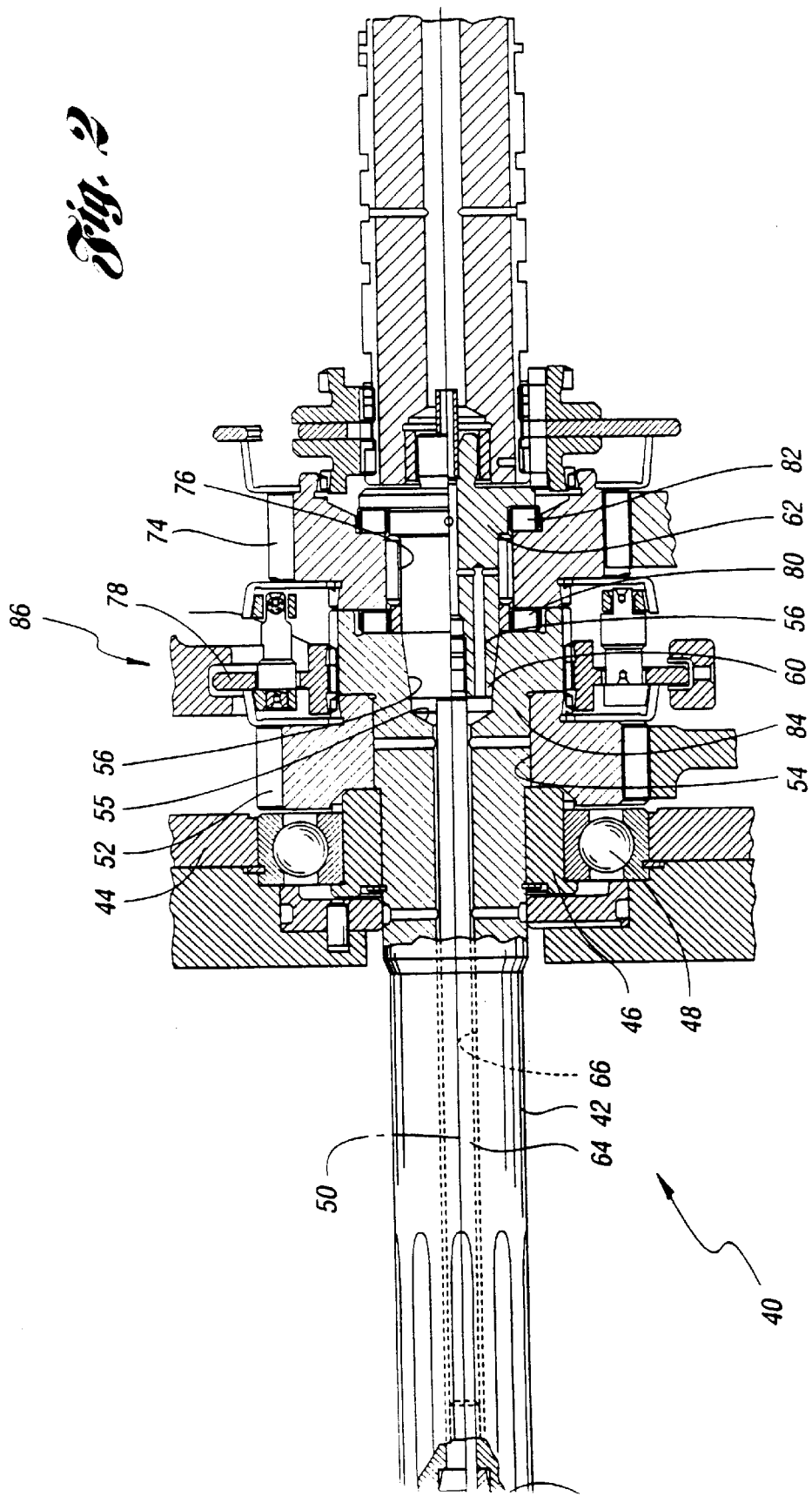
FIG. 2 shows a partially cut-away sectional view of a transmission assembly in accordance with the present invention.

Referring to FIGS. 2–3, a compound change gear transmission assembly 40 is shown in accordance with the present invention. The assembly 40 includes an input shaft 42 which carries torque into the assembly. The input shaft 42 is supported within the transmission housing 44 by a spacer 46 which is rotatably supported with respect to the housing 44 by an input bearing 48.

The input shaft 42 is disposed along a central axis 50. A splitter gear 52 is disposed on the input shaft 42 adjacent the spacer 46. The splitter gear 52 has a central bore 54 formed therethrough with a minimal diametral clearance with respect to the input shaft in order to minimize splitter gear tipping. This diametral clearance provides sufficient float in order to maintain a substantially balanced torque split between opposing countershafts when the splitter gear 52 is operated in a high split mode. The minimal diametral clearance provides approximately a range between 40%–60% and 60%–40% torque split between opposing countershafts while minimizing gear tipping. This differential does not create a significant balance problem because excess torque on one countershaft is reacted by bearings and support structure in the assembly. In order to prevent further load sharing imbalance or torque split imbalance, a sufficient diametral clearance is maintained.

On the rearward end of the input shaft 42, a spindle pocket 55 is formed on the input shaft and includes tapered sidewalls 56 for receiving a tapered nose section 60 of the spindle 62. The spindle 62 is rigidly secured to the input shaft 42 by means of the long attachment stud 64. The input shaft 42 has a central aperture 66 formed therethrough along the central axis 50 for receiving the attachment stud 64. The stud 64 extends through the central aperture 66 and is screwed into the spindle 62 at the threads 68 (see FIG. 3). A spigot nut 70 is secured to the forward end of the attachment stud 64, and includes an O-ring seal 72 for preventing leakage of oil from the central aperture 66.

The mating taper 56 between the spindle 62 and input shaft 42 provides several advantages. The taper helps align the spindle and input shaft coaxially as the input shaft is fed into the transmission. It also allows the input shaft and spindle to be mated in any orientation blindly. The taper further provides a locking medium between the spindle and input shaft which allows the stud 64 and nut 70 to be tightened. The taper also allows the input shaft and spindle to be disassembled unrestrained. The use of oil between the two tapers offers to aid disassembly after long periods of time assembled together yet does not impair the locking qualities of the taper during assembly.

A headset/fourth gear 74 is rotatably mounted on the spindle 62 by the full complement needle roller bearing 76. With the spindle 62 rigidly secured to the input shaft 42, and the headset/fourth gear 74 rotatably mounted on the spindle 62 by the needle roller bearing set 76, concentricity and parallelism of the headset/fourth gear 74 is maintained with respect to the synchronizer clutch 78 so that gear hopout is prevented. The full complement needle roller bearing 76 under the headset gear serves to cope with radial loads generated in PTO operation at low split and radial loads resulting from countershaft torque imbalances.

Cylindrical thrust bearings 80,82 are provided on opposing sides of the headset/fourth gear 74 for reacting axial loads on the headset/fourth gear 74. In order to accommodate the thrust bearing 80, the rearward end 84 of the input shaft 42 provides an area of increased diameter to make room for the thrust bearing 80. The thrust bearings cope with thrust forces and differential speeds generated during normal operation. Placement of the bearings 80,82 against the input shaft 42 is advantageous to bearing life and bearing size because the operating conditions are changed.

The splitter synchronizer 86 has also been reconfigured such that its clutch 78 has been increased in diameter to allow fitment of the thrust bearing 80 within the existing constraints of the transmission. The synchro clutch 78 has a single internal symmetrical spline retaining traditional back tapers, which are employed to overcome the tendency for the clutch to slowly work out of engagement. The back taper is machined to produce a slightly negative pressure angle creating a thrust force due to the effects of torsion working to keep the coupled members engaged. The increased spline diameter acts to reduce the amount of possible pits that exists with the prior art sliding splines, while allowing the same freedom to float, which allows the clutch to find its desired radial position to overcome machining inaccuracies. Clutches which do not possess adequate clearance will inevitably hopout if there are slight errors in concentricity and parallelism when the members are assembled, especially in the presence of drive line vibrations.

The function of the synchronizer 86 is to selectively engage either the splitter gear 52 or the headset/fourth gear 74 with the input shaft 42. No specific synchronizer arrangement is required for use with the present invention. The synchronizer design disclosed in U.S. Pat. No. 5,111,922 is preferred, as modified in FIGS. 2–8, and is hereby incorporated by reference in its entirety.

A slight modification to the above-referenced synchronizer design was required here. In order to ensure that the cup 88,90 always detached from the synchronizer cone 92,94 (see FIG. 4), the separator pins 96 were provided. The pins 96 are disposed through the center of the blocker pins 98,100 in order to maintain the pre-energizing indexing function of the synchronizer.

An alternative embodiment of the present invention is shown in FIGS. 4–5. In this embodiment, the input shaft 102 and spindle 104 do not have a tapered mating surface. Rather, a cylindrical aperture 106 formed in the input shaft 102 receives a cylindrical nose portion 108 of the spindle 104. Again, the attachment stud 110 is threaded into the spindle 104 at the threads 112 for securing the spindle 104 to the input shaft 102. In order to prevent rotation of the spindle 104 with respect to the input shaft 102, a dowel pin 114 is provided for cooperation with a mating groove 116 formed in the input shaft 102.

A second alternative embodiment of the present invention is shown in FIG. 6. The embodiment shown in FIG. 6 is otherwise similar to that shown in FIGS. 2–3 but for the reduced shank bolt 118 which extends through the central aperture 66 of the input shaft 42 for securing the spindle 62 to the input shaft 42. The reduced shank of the attachment stud 118 facilitates movement of oil along the stud 118. FIG. 6a illustrates the oil holes 87 and spacer 89.

A third alternative embodiment of the present invention is shown in FIG. 7. This embodiment is otherwise similar to the embodiments shown in FIGS. 2–3 and 6, but for the elimination of the long attachment stud. Rather, for securing the spindle 120 to the input shaft 122, a long hexagon key is inserted through the central aperture 124 of the input shaft 122, and is engaged in the hex head pocket 126 which is formed in the spindle 120. This long hexagon key may then be used to rotate the spindle 120 with respect to the input shaft 122 for securing the spindle to the input shaft. Alternatively, the long hexagon key can be used to secure the spindle 120 in position while the input shaft 122 is rotated to screw the input shaft and spindle together by means of the threads 128. The socket head 130 is provided at the first end of the input shaft 122 in order to prevent oil from escaping from the central aperture 124 of the input shaft 122. FIG. 7a illustrates the oil holes 121 and spacer 123.

A fourth alternative embodiment of the present invention is shown in FIGS. 8–8a. The embodiment shown in FIG. 8 is otherwise similar to the embodiments shown in FIGS. 6–7, but for the shorter reduced shank attachment screw 132 which secures the spindle 134 to the input shaft 136. In this embodiment, the attachment screw 132 has a hex head pocket 138 formed therein for receiving a long hexagon key placed through the central aperture 140 of the input shaft 136. The attachment screw 132 is rotated by the hexagon key, and the threads 142 engage the attachment screw 132 with the spindle 134, and the screw head 144 engages the screw seat 146 formed in the input shaft 136. In this manner, the spindle 134 is rigidly secured to the input shaft 136. A spigot plug 148 is then screwed into the input shaft 136 by means of the threads 150 for plugging the central aperture 140 of the input shaft 136. FIG. 8a shows a vertical cross-section taken through FIG. 8 for illustrating the oil holes 152,154 and spacer 156.

While the best modes for carrying out the invention have been described in detail, those familiar with the art to which this invention relates will recognize various alternative designs and embodiments for practicing the invention within the scope of the appended claims.

What is claimed is:

1. An improved compound transmission with reduced gear hopout, including an input shaft disposed along a central axis, a floating main shaft disposed substantially along the central axis, an auxiliary section adjacent the main shaft, and at least one countershaft parallel with and spaced from the central axis, said countershaft being operative to transmit input shaft torque to the main shaft and to facilitate "power take off" (PTO) operation, the improvement comprising:

a splitter gear disposed on the input shaft and having a central bore formed therethrough with minimal diametral clearance with respect to the input shaft to minimize splitter gear tipping;

said input shaft forming a central aperture therethrough along said central axis and having a rearward end, and further forming a spindle pocket along said central axis at the rearward end;

a spindle received in said spindle pocket and having an attachment aperture formed therethrough along said central axis in communication with said central aperture;

an attachment stud extending through said central aperture, and further extending through said attachment aperture in said spindle for rigidly securing said spindle to said input shaft; and a headset gear rotatably mounted on the spindle.

2. The transmission assembly of claim 1, further comprising a needle roller bearing assembly positioned within said headset gear for rotatably mounting said headset gear with respect to said spindle, and wherein said central bore has a sufficient diametral clearance with respect to the input shaft to maintain a substantial load-sharing balance.

3. The transmission assembly of claim 2, further comprising thrust bearings positioned on opposing sides of said headset gear.

4. The transmission assembly of claim 1, wherein said spindle pocket comprises tapered side walls, and said spindle includes a tapered nose section for cooperation with said tapered side walls.

5. The transmission assembly of claim 1, further comprising a synchronizer disposed about the input shaft and positioned between the splitter gear and headset gear for selectively engaging the splitter gear or headset gear with the input shaft.

6. The transmission assembly of claim 1, further comprising an anti-rotation pin engaged between the spindle and input shaft to prevent relative rotation therebetween.

7. An improved compound transmission assembly with reduced gear hopout, including an input shaft disposed along a central axis, a floating main shaft disposed substantially along the central axis, said countershaft being operative to transmit input shaft torque to the main shaft and to facilitate "power take off" (PTO) operation, the improvement comprising:

a splitter gear disposed on the input shaft and having a central bore formed therethrough with a minimal diametral clearance with respect to the input shaft to minimize splitter gear tipping;

a spindle fixed to an end of the input shaft along the central axis;

a headset gear disposed around the spindle; and a needle roller bearing assembly positioned within the headset gear for rotatably mounting the headset gear on the spindle while minimizing headset gear tipping.

8. The transmission assembly of claim 7, wherein said input shaft and spindle include a central aperture formed therethrough, the assembly further comprising an attachment stud extending through the central apertures in the input shaft and spindle for securing the spindle to the input shaft.

9. The transmission assembly of claim 8, wherein said attachment stud comprises a central region of reduced diameter to facilitate passage of oil along the stud.

10. The transmission assembly of claim 7, wherein said input shaft forms a spindle pocket at said end of the input shaft for receiving the spindle.

11. The transmission assembly of claim 8, wherein said spindle pocket comprises tapered sidewalls, and said spindle includes a tapered nose section for cooperation with said tapered side walls.

12. The transmission assembly of claim 7, further comprising a synchronizer disposed about the input shaft and positioned between the splitter gear and headset gear for selectively engaging the splitter gear or headset gear with the input shaft.

13. An improved compound transmission assembly with reduced gear hopout, including an input shaft disposed along a central axis, a floating main shaft disposed substantially along the central axis, an auxiliary section adjacent the main shaft, and at least one countershaft parallel with and spaced from the central axis, said countershaft being operative to transmit input shaft torque to the main shaft and to facilitate "power take off" (PTO) operation, the improvement comprising:

a splitter gear disposed on the input shaft and having a central bore formed therethrough with a minimal diametral clearance with respect to the input shaft to minimize splitter gear tipping;

said input shaft forming a central aperture therethrough along said central axis and having a rearward end, and further forming a tapered spindle pocket along said central axis at the rearward end;

a spindle received in the spindle pocket and having an attachment aperture formed therethrough along said central axis in communication with said central aperture;

an attachment stud extending through said central aperture, and further extending through said attachment aperture in said spindle for rigidly securing said spindle to said input shaft;

a headset gear rotatably mounted on the spindle;

a needle roller bearing assembly positioned within the headset gear for rotatably mounting the headset gear on the spindle while minimizing headset gear tipping;

trust bearings positioned on opposing sides of said headset gear; and a synchronizer disposed about the input shaft and positioned between the splitter gear and headset gear for selectively engaging the splitter gear or headset gear with the input shaft.

* * * * *